United States Patent
Apte et al.

(10) Patent No.: US 6,662,236 B1
(45) Date of Patent: Dec. 9, 2003

(54) RUNTIME OBJECT BINDING IN SCRIPTING

(75) Inventors: Ajay Apte, Austin, TX (US); Ping Chen, Austin, TX (US); John Sanchez, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/106,628

(22) Filed: Jun. 29, 1998

(51) Int. Cl.[7] .................................................. G06F 9/00
(52) U.S. Cl. ........................ 709/320; 709/332; 717/115
(58) Field of Search .............................. 717/1, 108, 114, 717/115, 116, 162, 165; 709/315, 200, 320, 331, 332, 316, 318

(56) References Cited

U.S. PATENT DOCUMENTS

| | | | | |
|---|---|---|---|---|
| 5,590,330 A | | 12/1996 | Coskun et al. ............... | 395/704 |
| 5,623,657 A | * | 4/1997 | Conner et al. ............... | 709/320 |
| 5,692,198 A | | 11/1997 | Ushiku ........................ | 395/762 |
| 5,943,496 A | * | 8/1999 | Li et al. ...................... | 709/328 |
| 5,978,811 A | * | 11/1999 | Smiley ........................ | 707/103 |
| 5,983,019 A | * | 11/1999 | Davidson .................... | 395/705 |
| 6,078,743 A | * | 6/2000 | Apte et al. ................... | 395/701 |
| 6,083,276 A | * | 7/2000 | Davidson et al. ............... | 717/1 |
| 6,256,772 B1 | * | 7/2001 | Apte et al. ................... | 717/100 |
| 6,263,379 B1 | * | 7/2001 | Atkinson et al. ........... | 709/332 |
| 6,289,395 B1 | * | 9/2001 | Apte et al. ................... | 709/318 |

* cited by examiner

Primary Examiner—John Follansbee
Assistant Examiner—Van Hoa Nguyen
(74) Attorney, Agent, or Firm—David A. Mims, Jr.; Bracewell & Patterson, L.L.P.

(57) ABSTRACT

A method of providing a script for a computer application, by creating an object-oriented scripting environment which allows a user to enter separate code as a script, registering one or more objects with the scripting environment using a script macro, and instantiating the objects at runtime using a script code. The script macro may be re-used to instantiate multiple sets of objects named in the script code. Objects are registered with only names and classes, and then instantiated by determining one or more classes of the objects, and rebuilding class information. The application may be a Java applet which includes the script macro, and the instantiation includes instantiating a Java bean named in the script code. The Java bean may be instantiated by first determining its attributes, and then invoking the bean using a customizer. Since the objects are not stored at design time, objects can be scripted even if they cannot be saved (e.g., nonserializable Java beans).

18 Claims, 4 Drawing Sheets

RUNTIME OBJECT BINDING IN SCRIPTING

BACKGROUND OF THE INVENTION

1. Field of the Invention

The present invention generally relates to computer systems, particularly to a method of creating computer programs using programming languages, and more specifically to a method of defining a script macro using an object-oriented programming language such that the script macro may be used on multiple sets of objects.

2. Description of Related Art

A generalized structure for a conventional computer system includes one or more processing units connected to a system memory device (random access memory or RAM) and to various peripheral, or input/output (I/O), devices. The I/O devices typically include a display monitor, a keyboard, a graphical pointer (mouse), and a permanent storage device (hard disk). The system memory device is used by a processing unit in carrying out program instructions, and stores those instructions as well as data values that are fed to or generated by the programs. A processing unit communicates with the other components by various means, including one or more interconnects (buses), or direct access channels. A computer system may have many additional components, such as serial and parallel ports for connection to, e.g., printers, and network adapters. Other components might further be used in conjunction with the foregoing; for example, a display adapter might be used to control a video display monitor, a memory controller can be used to access the system memory, etc.

A computer program is accordingly a set of program instructions which are adapted to perform certain functions acting upon, or in response to, the I/O devices. Program instructions that are carried out by the processor are, at that lowest level, binary in form, i.e., a series of ones and zeros. These executable (machine-readable) program instructions are produced from higher-level instructions written in a programming language. The programming language may still be low-level, such as assembly language (which is difficult to use since instructions appear as hexadecimal bytes), or may be a higher level language in which instructions are created using more easily understood words and symbols. One example of a high level programming language is "C" (or its improved version "C++"). After a computer program is written in C++, it is converted into machine code using a compiler (which reduces the high-level code into assembly language) and a linker (which transforms the assembly language into machine code).

In an attempt to simplify programming, and yet still provide powerful development tools, programmers have created "object-oriented" programming languages, in which each variable, function, etc., can be considered an object of a particular class. C++ is an example of an object-oriented programming language, and provides advanced programming features such as polymorphism, encapsulation, and inheritance. This programming language also allows the use of a "macro," that is, a name that defines a set of instructions that are substituted for the macro name wherever the name appears in a program (a process called macro expansion) when the program is compiled or assembled. Macros are similar to functions in that they can take arguments, and in that they are calls to lengthier sets of instructions. Unlike functions, macros are replaced by the actual instructions they represent when the program is prepared for execution.

"Java" is another object-oriented programming language, developed by Sun Microsystems, Inc. Java is similar to the C++ programming language, but Java is smaller, more portable, and easier to use than C++ because it manages memory on its own. Java programs are compiled into bytecodes, which are similar to machine code but are not specific to any platform. Currently, the most widespread use of Java is in programming small applications (applets) for the World Wide Web of the Internet. These applets do not run as separate programs, but rather are loaded within another application that has Java support, such as a web browser. The term "applet" is particularly utilized to refer to such programs as they are embedded in-line as objects in hypertext markup language (HTML) documents.

Portions of Java code (components) which are self-contained, and can often be re-used in different applets, are sometimes referred to as "beans." Such components can be visually composed into units using visual application builder tools. Java builder tools can maintain beans in a palette or toolbox, and a particular bean can be selected from the toolbox, dropped into an applet or other component (such as a form), and its behavior defined, all without writing any actual code.

Figure 1:
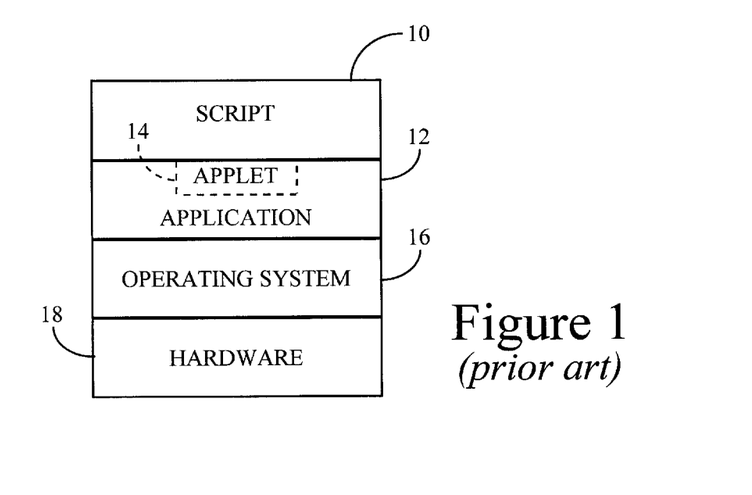
FIG. 1 is a pictorial representation of a prior art, hypertext markup language (HTML) document having a Java applet and an embedded JavaScript script.

While programming languages are used to create an application, developers also utilize "scripting" languages to design a script, or set of instructions (commands), used by a particular application to perform a specific task. FIG. 1 is a generic diagram showing the relationship of a script 10 to an application 12 (which may include an applet 14), the computer's operating system 16, and the hardware 18 (viz., the processor). Script 10 feeds commands to application 12 (or applet 14), and operating system 16 manages execution of the application's processing of script 10. In other words, the computer's hardware 18 is first initialized using operating system 16, which then acts as a platform to load application 12; after application 12 has been loaded, it reads and executes the commands in script 10. An example of an early scripting language is PERL (Practical Extraction and Report Language), an interpreted language based on C and UNIX. PERL can assemble a string and send it to an application or operating shell as a command.

Figure 2:
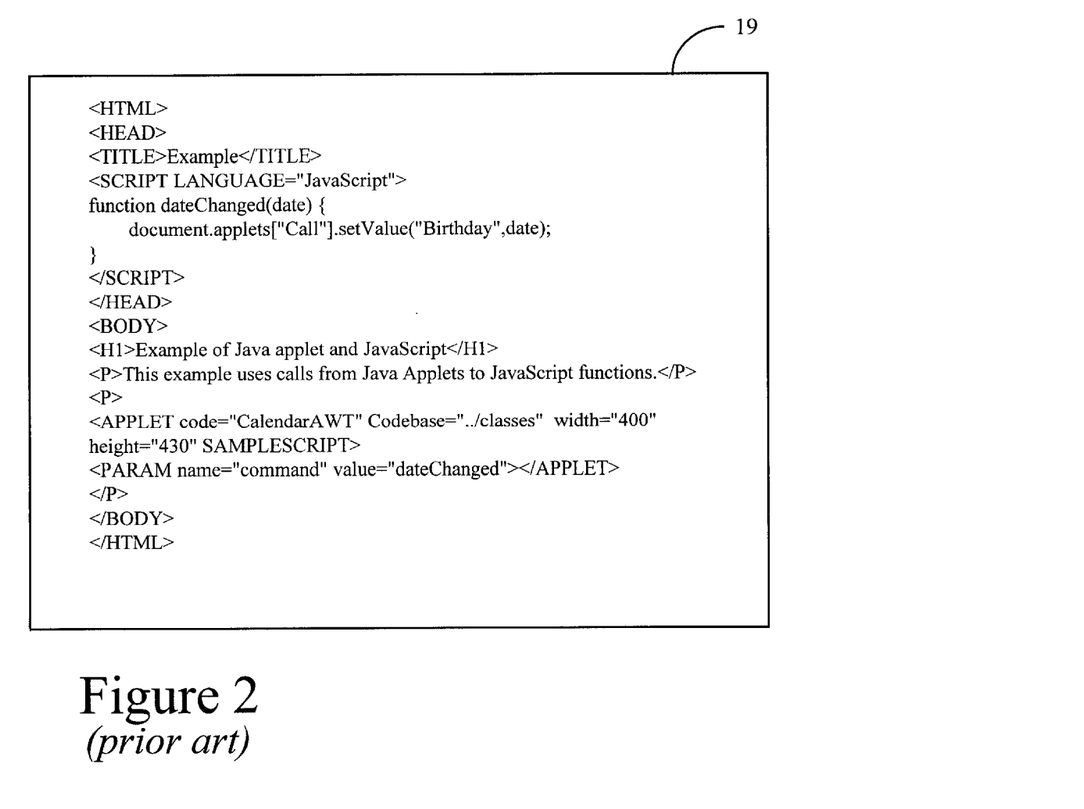
FIG. 2 is a pictorial representation of the conventional manner in which a script runs on an application which has been loaded using an operating system of a computer.

Another example of a scripting language is JavaScript, developed by Netscape Communications and Sun Microsystems. JavaScript, while somewhat related to Java, is not an object-oriented language. JavaScript complements Java by exposing useful properties of Java applets to script authors. JavaScript scripts embedded directly in HTML documents can get and set exposed properties in order to query the state or alter the performance of an applet, as shown in FIG. 2. In this example, the HTML page 19 specifies the parameter "command" for the name of the JavaScript function to be called when a date is selected.

Existing applications that have scripting ability (including browsers that support JavaScript) connect a set of predefined, named objects to the script. It is possible to rename an object but it is not possible to assign a new object for a given name. In other words, current scripting applications do not allow a script writer to define a script macro which has some script for a set of generic named objects, and which can hence work on various sets of objects that conform to certain conditions predefined in the script macro. It would, therefore, be desirable to devise a method of defining a script macro such that the script macro may be used on multiple sets of objects. It would be further advantageous if the script macro could be instantiated/restored without instantiating its objects.

SUMMARY OF THE INVENTION

It is therefore one object of the present invention to provide an improved method of developing computer programs.

It is another object of the present invention to provide such a method which can be implemented with an object-oriented programming language and a script code.

It is yet another object of the present invention to provide such a method using a script macro, wherein object instances are not bound with.:the script macro, but rather are supplied at runtime.

The foregoing objects are achieved in a method of providing instructions to an application running on a computer system, generally comprising the steps of creating an object-oriented scripting environment which allows a user to enter separate code as a script, registering one or more objects with the scripting environment using a script macro, and instantiating the objects at runtime using a script code. The method allows re-use of the script macro to instantiate multiple sets of objects named in the script code. The registering step may register the objects with only names and classes; the objects are then instantiated by determining one or more classes of the one or more objects, and rebuilding class information in a memory device of the computer system.

In the illustrative embodiment, the application is designed using an object-oriented programming language, and the script code is written in the same object-oriented programming language. More specifically, the application is a Java applet which includes the script macro, and the instantiating step includes the step of instantiating a Java bean named in the script code. The Java bean may be instantiated by first determining its attributes, and then invoking the bean using a customizer.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 3:
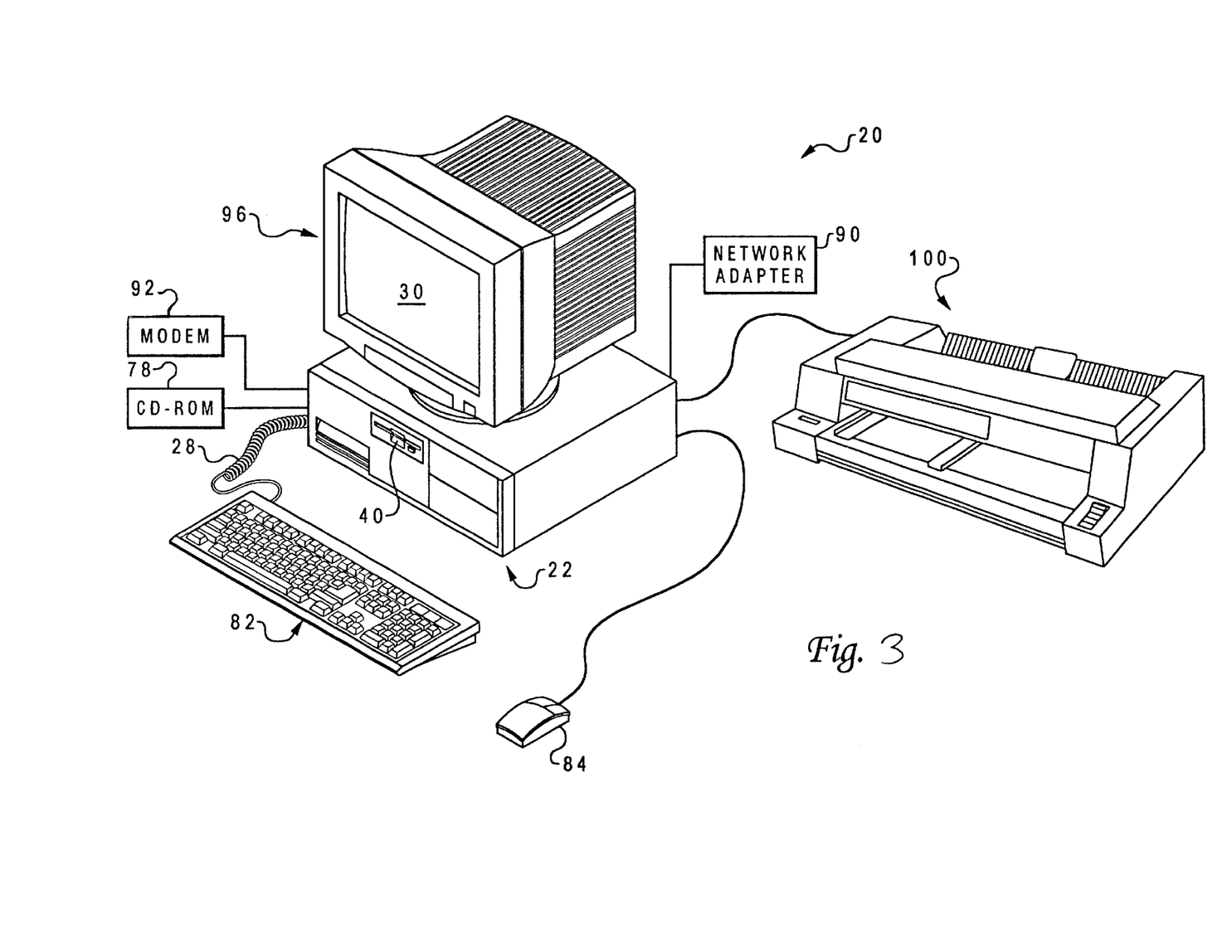
FIG. 3 is a perspective view of one embodiment of a data processing system in which the present invention can be practiced.

With further reference to FIG. 3, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cathode ray tube (CRT), a liquid crystal display (LCD), an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such a modem 92, CD-ROM 78, network adapter 90, and floppy disk drive 40, each of which may be internal or external to the enclosure or processor 22. An output device such as a printer 100 may also be coupled with processor 22.

It should be noted and recognized by those persons of ordinary skill in the art that display 96, keyboard 82, and pointing device 84 may each be implemented using any one of several known off-the-shelf components.

Figure 4:
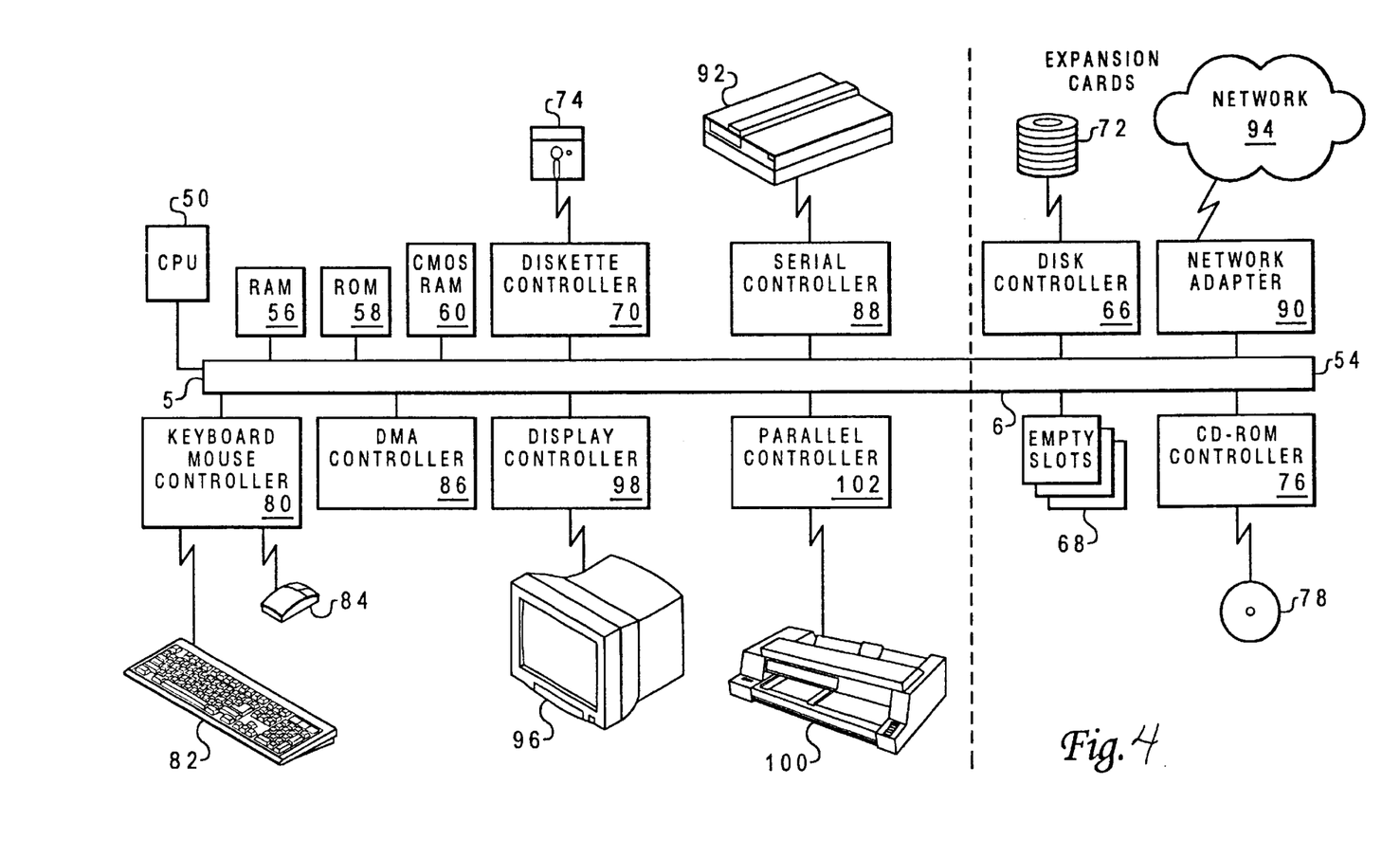
FIG. 4 is a high-level block diagram illustrating selected components that can be included in the data processing system of FIG. 3 according to the teachings of the present invention.

Reference now being made to FIG. 4, a high level block diagram is shown illustrating selected components that can be included in the data processing system 20 of FIG. 3 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and nonvolatile memory 60. Such memories include circuitry that allows information to be stored and retrieved. ROMs contain stored data that cannot be modified. Data stored in RAM can be changed by CPU 50 or other hardware devices. Nonvolatile memory is memory that does not lose data when power is removed from it. Nonvolatile memories include ROM, EPROM, flash memory, or battery-pack CMOS RAM. As shown in FIG. 4, such battery-pack CMOS RAM may be used to store configuration information.

An expansion card or board is a circuit board that includes chips and other electronic components connected that adds functions or resources to the computer. Typically, expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example of such a slot is PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle tasks such as positioning read/write head, mediating between the drive and the CPU 50, and controlling the transfer of information to and from memory. A single disk controller may be able to control more than one disk drive.

CD-ROM controller 76 may be included in data processing 20 for reading data from CD-ROM 78 (compact disk read only memory). Such CD-ROMs use laser optics rather than magnetic means for reading data.

Keyboard mouse controller 80 is provided in data processing system 20 for interfacing with keyboard 82 and pointing device 84. Such pointing devices are typically used to control an on-screen element, such as a graphical pointer or cursor, which may take the form of an arrow having a hot spot that specifies the location of the pointer when the user presses a mouse button. Other pointing devices include a graphics tablet, stylus, light pin, joystick, puck, track ball, track pad, and the pointing device sold under the trademark "Track Point" by International Business Machines Corp. (IBM).

Communication between processing system 20 and other data processing systems may. be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over standard telephone lines. Modems convert digital computer signals to interlock signals suitable for communications over telephone lines. Modem 92 can be utilized to connect data processing system 20 to an on-line information service or an Internet service provider. Such service providers may offer software that can be down loaded into data processing system 20 via modem 92. Modem 92 may provide a connection to other sources of software, such as a server, an electronic bulletin board (BBS), or the Internet (including the World Wide Web).

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task. Network 94 can also provide a connection to other systems like those mentioned above (a BBS, the Internet, etc.).

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image (or combinations thereof) on paper or on another medium, such as a transparency sheet. Other types of printers may include an image setter, a plotter, or a film recorder.

Parallel controller 102 is used to send multiple data and control bits simultaneously over wires connected between system bus 5 and another parallel communication device, such as a printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 4. Those skilled in the art will appreciate that a data processing system constructed in accordance with the present invention may have multiple components selected from the foregoing, including even multiple processors.

Figure 5:
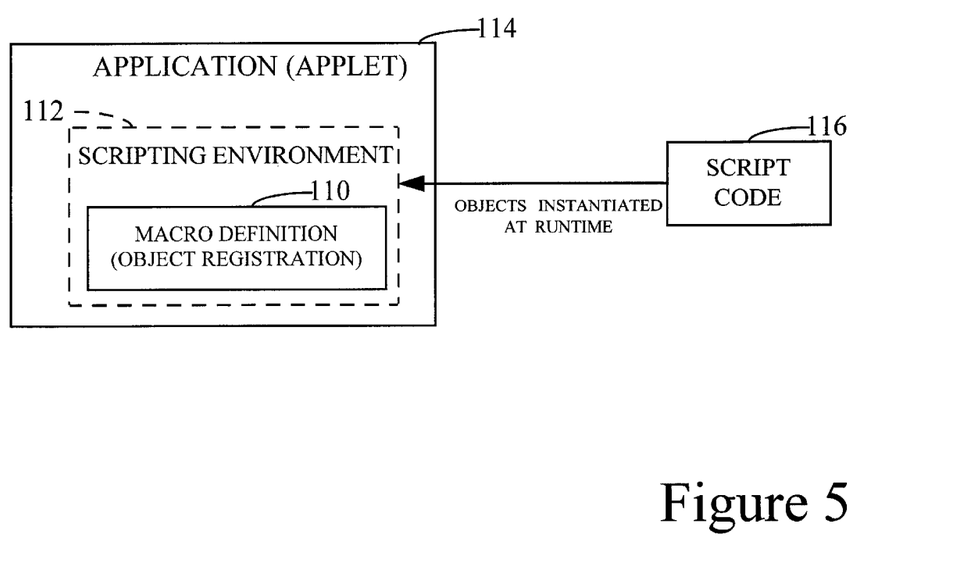
FIG. 5 is a block diagram illustrating how the data processing system of FIGS. 3 and 4 defines a script macro which may be used on multiple sets of objects, in accordance with one embodiment of the present invention.

Referring now to FIG. 5, one embodiment of the present invention allows data processing system 20 to define a script macro 110 using an object-oriented scripting environment 112 provided by an application (or applet) 114, wherein script macro 110 connects different objects, but the objects are registered only with their names and their types (classes), and references to the objects themselves are not stored. Thereafter, when a. script 116 is executed, the objects are bound at runtime with the names specified in script 116; in other words, the references to the objects become associated with corresponding memory addresses and stored values. The script macro may thus be used on multiple sets of objects.

Script macro 110 provides a set of generic named objects, and operates on various sets of objects that conform to certain conditions predefined in the script macro. Script macro 110 may be written in an object-oriented programming language, particularly Java, such that it can be embodied in a Java applet adapted to run on data processing system 20 using a web browser. In this implementation, the applet can run in any browser that supports Java, or in other viewing devices, such as Appletviewer, a Java virtual machine from Sun Microsystems, Inc.

The Appendices provide sample code that demonstrates the use of a script as a macro (all of this code is written in Java, not JavaScript). The first file, named "BeanContainer.java" (Appendix A), provides a scripting framework which creates a scripting environment, and allows the user to enter separate Java code as a script. This file also creates two sample objects, a table and a button. The class names of the objects and their script names are registered with the scripting environment, but the scripting engine does not bind any object instances with the script. Instead, the object instances are supplied at runtime, via the script code (Appendix B).

The "BeanContainer.java" code provides a method called "runScript" which retrieves a runtime scripting environment and runs a script on the created objects, and further provides a method called "getFreshObjectSet" which allows the user to create a new set of table and button objects that can be run against the same piece of script code using the "runScript" method. In this manner, a developer can write scripts with one set of objects registered with the environment, and then at runtime can provide a completely different set of objects, thereby re-using the same script on multiple sets of objects. The only condition is that an object instance supplied at runtime for a given object name should be of the same class as the object that was originally registered with the environment. For example, in this code, the table instance corresponds to "tableName (String name of the table object)", and the button instance corresponds to "buttonName (String name of the button object)"; for a fresh set of objects to be used, an object instance associated with tableName should be of class "table" only.

Appendix B is the sample script code. This file was generated using IBM Bean Extender Java Scripting Component. This sample script code uses one table and one button. Of course, other objects may be scripted, such as forms.

A more practical example of how the foregoing sample code might be used, relates to the presentation of stock market information via a web browser (displayed on monitor 30). An applet may be designed to run in the browser, wherein the applet creates a table of information for the stock of a specific company (e.g., the stock's current price, its daily high and low prices, etc.), and provides a single button adjacent to the table, to retrieve a graph of the stock's recent price history. A user who desires to view multiple stock tables on a single HTML page can write a script that repeatedly calls the macro embedded in the applet, to create (instantiate) multiple tables and corresponding graph buttons for a plurality of stocks.

A Java applet constructed in accordance with the present invention may be archived, e.g., with a Java applet resource (JAR) file, to take advantage of packaging concepts and decrease download time by utilizing compression software and a single transmission connection to download all the resources required by the applet. The developer can package the applet classes and any other resources required by the applet into a single JAR file, and then provide an intermediate driver HTML file that specifies the JAR archive file as the resource to load, using a tag within the file.

The present invention thus offers several advantages over current programming solutions. A single script macro can be used for multiple sets of objects, and objects need not be instantiated at design time, since only the type of the object is needed, which improves performance. Also, since the objects are not stored at design time, objects can be scripted even if they cannot be saved (for example, the present invention allows the scripting of nonserializable Java beans). The macro just finds the class at runtime and rebuilds information in memory. In the case of a bean, the macro can figure out what message, attributes, etc., the bean possesses, and can use a customizer to invoke the bean. Finally, storing the object types during script writing ensures type checking of objects at runtime.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

APPENDIX A

"BeanContainer.java"

```
import com.ibm.beans.script.*,
import com.ibm.beans.script comp.java.SCRJavaEnvironment;
import com.ibm.beans.script.demo.beans.table.Tablemodel.class;
import sunw.demo.ourButton;
import java.lang.*,
import java.util.*;
impart java.io.*;
public class BeanContainer {
    TableModel table;
    OurButton button;
    String tablename;
    String buttonname;
    SCRJavaEnvironment scrEnv;
    public BeanContainer() implements SCRRTClient {
        // We first create a scripting environment
        // that uses Java as a scripting language.
        SCREnvironmentFactory factory = SCREnvironmentFactory();
        private transient SCRComponentDescriptor list[];
```

APPENDIX A-continued

"BeanContainer.java"

```
        list = factory.queryRegisteredComponents();
        scrEnv = factory.create(this, list[0]);
        // Now we create the beans that we need to write the script for
        // and register them with the scripting environment
        table = new TableModel();
        tablename = shortName(table.getClass().getName());
        // We register only the table class and the name of the table
        // object. This helps us replace the actual table object at
        // runtime, treating the generated script as a macro.
        scrEnv.RegisterObject(table.getClass(), tablename);
        button = new OurButton();
        buttonName = shortName(button.getClass(),getName());
        scrEnv,registerObject(button.getClass(), buttonName);
    }
    public void runScript() {
        Hashtable tbl = new hashtable();
        boolean debugmode = false,
        tbl.put (table, tablename);
        tbl.put (button, buttonname);
        SCRRTEnvironment rtenv =
        scrEnv.getRTEnvironment(debugMode);
        // In the runtime environment we actually fill in the object
        // values with the names in the script code
        rtEnv.initialize(tbl);
        rtEnv.runScript (debugmode, this);
    }
    public void getFreshObjectSet() {
        // This replaces the objects: table and button by a new
        // set. But the objects are run against the same script.
        table = new TableModel();
        button = new OurButton();
    }
    // design time
    protected String shortName(String longname) {
        int 1 = longname.length();
        int dot = 0;
        for (int i = 0; i < 1; i++)
        {
            if (longName.charAt(i)=='.')
            {
                dot = i;
            }
        }
        String short_str = null;
        if (dot == 0)
            short_str = new String(longName);
        else
            short_str = longName.substring(dot+1);
        char[] name-array = short-str.toCharAtrayo;
        if(Character.isLetter(name_array[0]))
            name_array[0] = Character.toLowerCase(name_array[0]);
        return(new String(name_array) + lastIndex++);
    }
}
```

APPENDIX B

Script code

```
package scr.be;
import com.ibm,beans.script.comps.java.SCRJavaComponentScript,
import com.ibm.beans.script.comps.java.SCRJavaRTComponent;
import com.ibm.beans.script.demo.beans.table.TableModel;,
import java.awt.Dimension;
import java.awt.Rectangle;
import com.ibm.beans.script.demo.beans.table.CellIndex;
import com.ibm.beans.script.demo.beans.table.TableCell;
import java.awt.Graphics;
import java.lang.String;
import com.ibm.beans.script.demo.beans.table.TableModelListener;
import com.ibm.beans.script.demo.beans.table.TableModelEvent;
import java.awt.Component;
import java.awt.Color;
import java.awt.Insets;
```

APPENDIX B-continued

Script code

```
import java.awt.Font;
import java.awt.LayoutManager;
import com.ibm.beans.script.demo.beans.table.TableModelException;
import sunw.demo.buttons.OurButton;
import java.awt.event.ActionListener;
import java.beans.PropertyChangeListener;
import java.awt.Container;
import java.awt.peer.ComponentPeer;
import java.lang.Object;
import java.awl.Toolkit;
import java.util.Locale;
import java.awl.image.ColorModel;
import java.awt.Point;
import java.awt.FontMetrics;
import java.awt.Cursor;
import java.awt.Image;
import java.awt.image.Imageproducer;
import java.awt.image.ImageObserver;
import java.awt.Event;
import java.awt.AWTEvent;
import java.awt.event.ComponentListener;
import java.awt.event. FocusListener;
import java.awt.event.KeyListener;
import java.awt.event.MouseListener;
import java.awt.event.MouseMotionListener;
import java.awt.PopupMenu;
import java.awt.MenuComponent;
import java.io.PrintStream;
import java.io.PrintWriter;
import java.lang.Class;
import java.lang.interruptedException;
import java.awt.event.MouseEvent;
import java.awt.event.KeyEyent;
import java.awt.event.ComponentEvent;
import java.awt.event.ActionEvent;
import java.beans.PropertyChangeEvent;
import java.awt.event.FocusEvent;
    /* Prolog */
public class Script0__894484577917 extends SCRJavaComponentScript
{
    private transient COM.ibm.beans.script.demo.beans.table.TableModel tableModel0()
    private transient sunw.demo.buttons.OurButton ourButton1;
    /* Script Globals */
    int row = 1;
    int col = 0;
    double cnt = 0;
}
public void systemInitialize(SCRJavaRTComponent scrComponent)
{
    tableModel0 =
(COM.ibm.beans.script.demo.beans.table.TableModel)
(scrComponent.getObjectFor("tableModel0"));
    ourButton1 =
(sunw.demo.buttons.OurButton)
(scrComponent.getObjectFor("ourButton1"));
}
public void initialize()
{
    tableModel0.setCellString(0, 0, "Data");
}
public void terminate()
{
}
public void ourButton1__mouseClicked(java.awt.event.MouseEvent arg0)
{
    tableModel0.setCellDouble(row++, col, cnt++);
    tableModel0.repaint();
}
public void ourButton1__mousePressed(java.awt.event.MouseEvent arg0)
{
}
public void ourButton1__mouseReleased(java.awt.event.MouseEvent arg0)
{
}
public void ourButton1__mouseEntered(java.awt.event.MouseEvent arg0)
{
}
public void ourButton1__mouseExited(java.awt.event.MouseEvent arg0)
{
}
```

What is claimed is:

1. A method of providing a set of instructions to an application running on a computer system, comprising the steps of:

creating an object-oriented scripting environment which allows a user to enter separate code as a script;

registering one or more objects with the scripting environment using a script macro to connect the one or more objects, wherein only the name and type of said one or more objects are utilized in said registration and references to the one or more objects are not stored; and instantiating the one or more objects at runtime using a script code.

2. The method of claim 1 wherein:

the application is designed using an object-oriented programming language; and the script code is written in the same object-oriented programming language.

3. The method of claim 1 wherein said instantiating step instantiates a first set of the one or more objects named in the script code, and further comprising the step of re-using the script macro to instantiate another set of the one or more objects named in the script code.

4. The method of claim 1 wherein said instantiating step includes the steps of:

determining one or more classes of the one or more objects; and rebuilding class information in a memory device of the computer system.

5. The method of claim 1 wherein:

the application is a Java applet which includes the script macro; and said instantiating step includes the step of instantiating a Java bean named in the script code.

6. The method of claim 5 wherein said instantiating step includes the steps of:

determining attributes of the Java bean; and invoking the Java bean using a customizer.

7. A computer system comprising:

a memory device;

a processor; and program means stored in said memory device for causing said processor to (i) create an object-oriented scripting environment which allows a user to enter separate code as a script, (ii) register only the names and classes of one or more objects with the scripting environment using a script macro to connect the one or more objects, wherein references to the one or more objects are not stored, and (iii) instantiate the one or more objects at runtime using a script code.

8. The computer system of claim 7 wherein:

said program means is designed using an object-oriented programming language; and the script code is written in the same object-oriented programming language.

9. The computer system of claim 7 wherein said program means instantiates the one or more objects as a first set of objects named in the script code, and further re-uses the script macro to instantiate another set of the one or more objects named in the script code.

10. The computer system of claim 7 wherein said program means instantiates the one or more objects by determining one or more classes of the one or more objects, and rebuilding class information in said memory device.

11. The computer system of claim 7 wherein:

said program means includes a Java applet having the script macro; and said program means instantiates a Java bean named in the script code.

12. The computer system of claim 11 wherein said program means instantiates the Java bean by determining attributes of the Java bean, and invoking the Java bean using a customizer.

13. A computer program product comprising:

a storage medium adapted to be read by a computer; and program means stored on said storage medium for (i) creating an object-oriented scripting environment which allows a user of the computer to enter separate code as a script, (ii) registering only the names and classes of one or more objects with the scripting environment using a script macro to connect the one or more objects, wherein references to the one or more objects are not stored, and (iii) instantiating the one or more objects at runtime using a script code.

14. The computer program product of claim 13 wherein:

the script code is written in an object-oriented programming language; and said program means is designed using the same object-oriented programming language.

15. The computer program product of claim 13 wherein said program means instantiates the one or more objects as a first set of objects named in the script code, and further re-uses the script macro to instantiate another set of the one or more objects named in the script code.

16. The computer program product of claim 13 wherein said program means instantiates the one or more objects by determining one or more classes of the one or more objects, and rebuilding class information in a memory device of the computer.

17. The computer program product of claim 13 wherein:

said program means includes a Java applet having the script macro; and said program means instantiates a Java bean named in the script code.

18. The computer program product of claim 17 wherein said program means instantiates the Java bean by determining attributes of the Java bean, and invoking the Java bean using a customizer.

* * * * *